United States Patent [19]

Myren

[11] 3,893,077

[45] July 1, 1975

[54] METHOD AND A SYSTEM FOR CHECKING THE ACCURACY OF INFORMATION DERIVED FROM AN ENCODED CARRIER MEMBER

[75] Inventor: Rune L. Myren, Spanga, Sweden

[73] Assignee: Svenska Dataregister AB, Solna, Sweden

[22] Filed: Jan. 9, 1973

[21] Appl. No.: 322,225

[30] Foreign Application Priority Data

Jan. 27, 1972 Sweden .................................. 918/72

[52] U.S. Cl................. 340/146.1 R; 340/146.1 AB; 340/146.3 F

[51] Int. Cl.......................... G06k 5/00; G11b 27/36

[58] Field of Search............ 340/146.1 R, 146.1 AB, 340/146.3 F, 146.3 Y, 173 LT

[56] References Cited

OTHER PUBLICATIONS

Huth, Jr., H. T., Error Improvement Delta B Self Clocking Code, in IBM Tech. Disc. Bull., 15(7): pp. 2233–2234, December, 1972.

Roberts, D. C. et al., Adaptive Line Code Reader, in IBM Tech. Disc. Bull., 9(1): pp. 52–55, June, 1966.

*Primary Examiner*—Malcolm A. Morrison
*Assistant Examiner*—R. Stephen Dildine, Jr.
*Attorney, Agent, or Firm*—Norman Friedman; Robert F. Rotella; Stephen A. Roen

[57] ABSTRACT

A data record consisting of a series of markings representing a code such as on a tag or label is checked for errors generated by spots or smudges associated with the markings by measuring the width of a marking including any associated spot or smudge and comparing the measured width and the width of previous and successive markings and the length of the spacing between such previous and successive markings and said measured width.

17 Claims, 2 Drawing Figures

METHOD AND A SYSTEM FOR CHECKING THE ACCURACY OF INFORMATION DERIVED FROM AN ENCODED CARRIER MEMBER

BACKGROUND OF THE INVENTION

The present invention relates to a system and a method for checking the accuracy of a data signal transduced by optical means from an information carrier and wherein the data recording is in the form of a bar-type code comprising bars or circular sections having predetermined widths and a reflectivity which differs from that of the carrier member or data record.

In order to make maximum use of the work saving and increased efficiency advantages inherent in automatic data processing techniques, and using an optical data recognition system, it is important that all possible sources of error be eliminated or at least minimized. This, of course, must be done to an extent justifiable in consideration of the costs and the advantages obtained.

When a coded information data signal is recorded on a carrier, measures are generally taken to facilitate the checking of the correctness or accuracy of the data as recorded or of the reading out of the data following playback or data transduction. For example, when a binary recording technique is employed, each data character can be recorded such that its coded representation comprises either an odd or even number of binary 1's or 0's. This is accomplished by means of a parity bit which may be added to the data code representation for the total information signal or component characters comprising the message or information data signal. Another type of error checking measure provides for the addition of different types of checking characters to a group of information or data bearing characters. This character combination can be used for checking the correctness or accuracy of the information data as recorded on the carrier. Still another system utilizes *m*-of-*n* codes which, if for example, a binary code is used, then during playback the information data signal will be accepted as correct only if each character consists of *m* 1's and *n* 0's or the converse.

In addition to, or in combination with, the abovementioned or similar error prevention measures which may be used in connection with the recording of a binary coded data signal, other error checking techniques are known and may be utilized. For example, in recordings adapted for optical recognition of the data signal, the data record and carrier member may be of a special type of paper and of a particular color.

It has been found that these previously known error checking measures and detection systems have in common a particular disadvantage in that errors may sometimes be generated during the data recording and usually in the printing of the coded data on the carrier member. These errors may take the form of ink smears or smudges which appear during the printing or afterwards. It is these printing errors which may not be detectable by the aforementioned error checking techniques. This is particularly true where the operation of the known error detection technique is dependent upon the coded data representation being in the form of bars or annular members or sectors thereof having a constant width or thickness. Aside from direct printing errors, changes in the printed bar widths can come about by smudging of the record carrier during handling or by deliberate falsification.

It is true that devices have been proposed which can detect if the information on the data record has been distorted due to falsification or has been distorted in any other manner, so that, for instance, a long distance between two adjacent bars or circular sections was originally a short distance. These known devices, however, are so constructed that special circuits are necessary for the reading of the code and other special circuits are necessary for checking the correctness of the code. Further, these special circuits and devices must be exactly synchronized in order to function satisfactorily. Moreover, these devices are analogous and utilize peak detection techniques which results in that when a black, incorrect bar or spot, for instance, is read, the resultant peak of a pulse will be placed on different locations in the time schedule. As a result the distance between the peaks of the pulses cannot be determined and the measuring or detecting results will be uncertain, thereby suggesting that the spot will not be detected and incorrect data will be transmitted to the data processing device to which the reader is connected.

It will be evident that in the acceptance of such incorrect data due to a nondetectable accompanying printing error, the advantages which are normally inherent in the use of automatic data processing techniques may be minimized or negated.

With respect to business transactions within the retail trade and wherein individual articles are provided with coded labels which may define, for example, price, kind of goods, etc., and where these labels are to be read by means of an optical transducing device, it is important that the read-back or transducing system include means apart from the heretofore described error checking techniques, for detecting any data errors which may be produced due to smudging of the labels during printing or handling of the articles.

It is therefore an object of the present invention to provide a simple and reliable error detection method and system which overcomes the above-mentioned disadvantages in the heretofore known error detection techniques.

The novel features which are considered to be characteristic of the invention are set forth with particularity in the appended claims. The invention itself, however, both as to its organization and method of operation, will best be understood from the following description when considered in connection with the accompanying drawings wherein:

DESCRIPTION OF AN ILLUSTRATIVE EMBODIMENT

Figure 2:
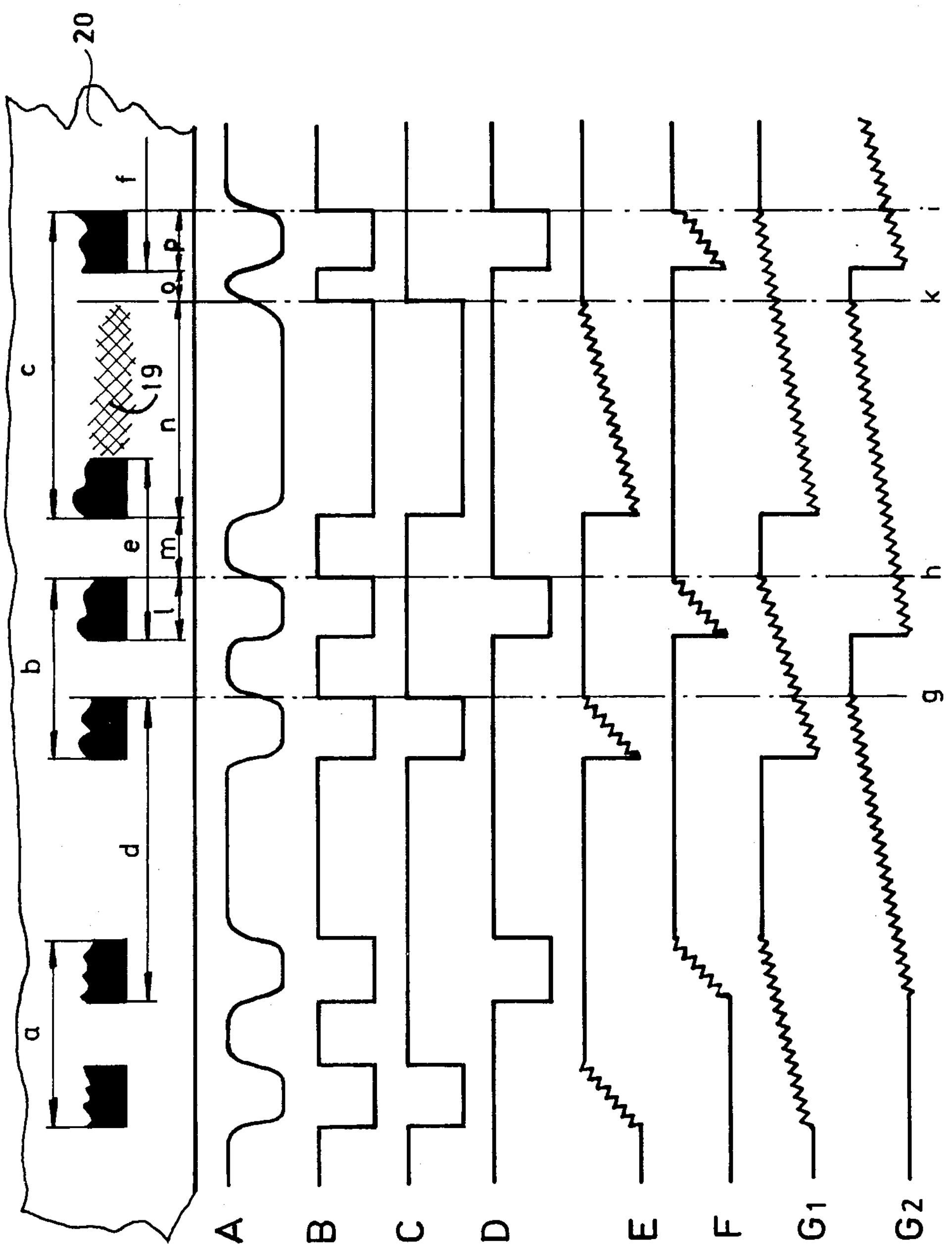
FIG. 2 illustrates a preferred embodiment of a portion of a label having printed therein a coded data signal compatible with the error detection system of FIG. 1. The figure also illustrates waveform signal representations that are generated at different points in the system shown in FIG. 1.

Turning now to the drawings, the label portion of FIG. 2 is illustrated with an example of a coded data representation to which the error detection system of the invention will be responsive. As shown, the label or data carier has imprinted thereon a plurality of black bars, each of which may have a width, for instance, of approximately 0.2mm. In the reading direction, i.e., the direction of scanning, one of two distances or space separations can appear between two adjacent black bars. In the label portion shown in FIG. 2 it will be stipulated for error checking purposes that in the code representation for each character there must always be two long distances. The label and thus the bar code representation is scanned and thereby read by means of a handheld optical reading device 2 which is penshaped. The reader 2 can be the reader described in U.S. Pat. No. 3,509,353. A more detailed description of the method and apparatus for identifying said long and short distances separating the bars may be had from Swedish Pat. No. 327,107. It will be understood that the system of the invention will be equally operable on a data code representation using other geometric forms, as for example, annular rings or sectors thereof and wherein the width spacing of the ring sectors may have different dimensions. Also, the code representation for each character may be stipulated to be other than two long distances.

Figure 1:
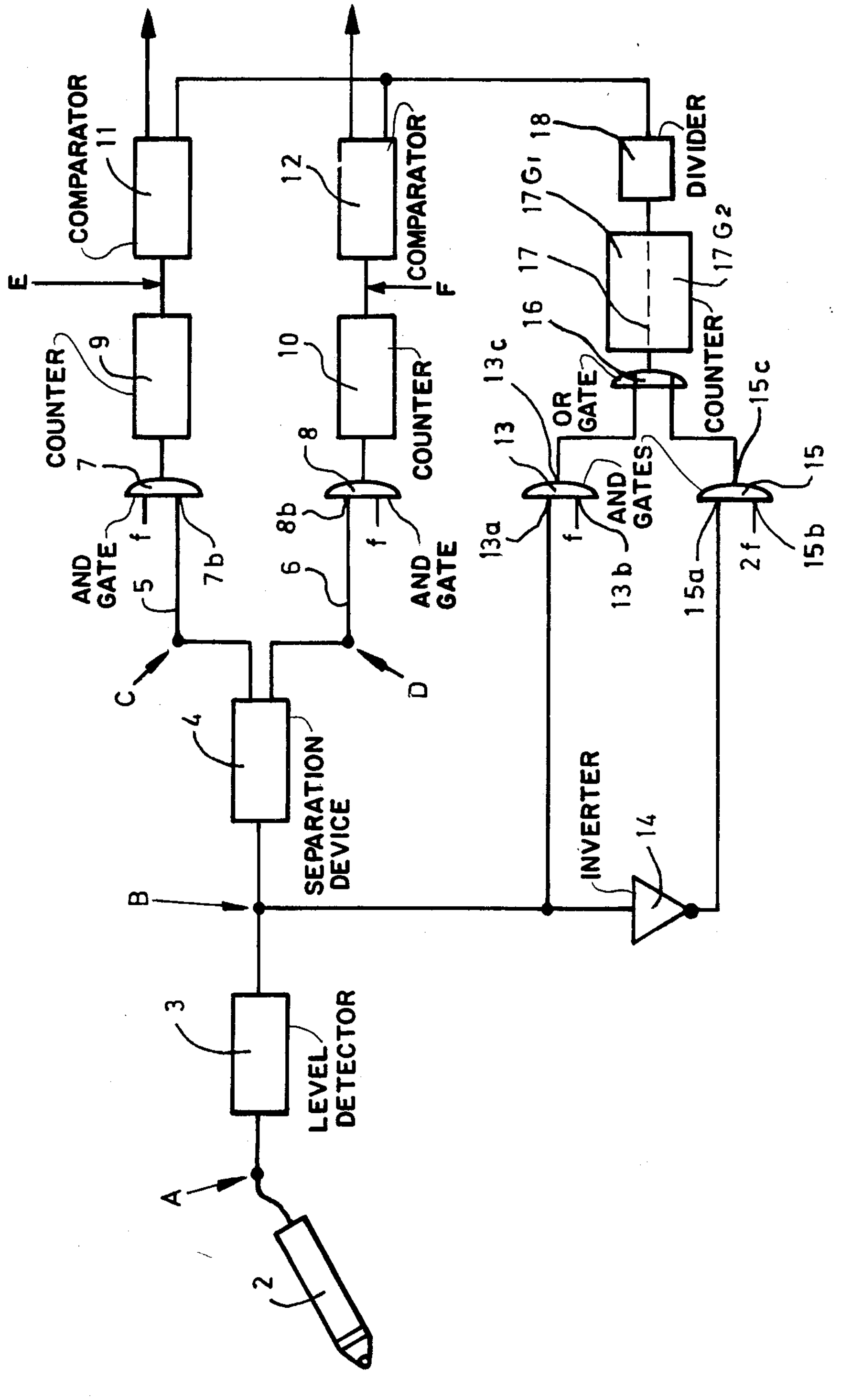
FIG. 1 schematically and in block form illustrates an error detection system in accordance with the present invention.

Turning now to the system of FIG. 1, the transduced data signal output from the optical reader 2 is coupled to a reflection detector comprising a black-white level detector 3 the output of which is connected to a separation device 4, including bistable means and output circuits. The separation device operates to separate the pulses from the output of the detector 3 into two pulse trains each one containing every second pulse of the pulse train transmitted to the input of the separation device 4. The two output terminals of the separation device 4 are coupled via connectors 5 and 6 to the respective input terminals 7*b* and 8*b* of two AND gates 7 and 8. The two other input terminals of AND gates 7 and 8 are supplied with a signal of a frequency *f*. The output of AND gate 7 is connected to a counter 9 and the output of AND gate 8 is connected to a counter 10. Counters 9 and 10 are respectively connected to comparators 11 and 12. The pulse train from detector 3 is not only transmitted to the separator 4 but is also transmitted to one input 13*a* of an AND gate 13 and via an inverter 14 to one input 15*a* of another AND gate 15. The other input 13*b* of AND gate 13 is supplied with the frequency *f* signal while the other input 15*b* of AND gate 15 is supplied with double this frequency, i.e., a signal having a frequency 2*f*. The output terminals 13*c* and 15*c* of AND gates 13 and 15 are connected to two input terminals of an OR gate 16, the output of which is connected to a double function counter 17. Counter 17 is connected to comparators 11 and 12 via a division circuit 18.

The function of the system will now be described assuming that a change or error 19 has been introduced into the data code representation on the label, a portion of which is shown at 20 in FIG. 2. This error may, for example, be due to a dirt spot or ink smear which causes a single bar to take up an asymmetrical form as shown. Due to the checking device according to the present invention, as will hereinafter be described, the output of the reader 2 will be sensed as incorrect information and an indication will be provided that an incorrect code has been recorded on the data carrier 20.

when the optical reader 2 is moved over the data record 20 the waveform A in FIG. 2 appears in point A in FIG. 1. In point B pulses are obtained which are shown at B in FIG. 2 and which correspond to the pulses which are obtained at A. At C in FIG. 2 there is shown the signal from one output of the separating device 4. This signal appears in point C in FIG. 1 as an input signal to one input 7*b* of AND gate 7. At D in FIG. 2 there is shown the signal emanating from the second output terminal of the separating device 4. This signal appears in point D in FIG. 1 as an input signal to one input 8*b* of AND gate 8. As is evident from C and D in FIG. 2 each second pulse in the pulse train emitted from the separation device 4 is transmitted to AND gate 7 and every other second pulse is transmitted to AND gate 8.

The function of counters 9, 10, and 17 is evident from E, F, $G_1$ and $G_2$ in FIG. 2. The counters can comprise any type of counter, such as a binary counter. Counter 9 counts n times for each pulse appearing at point C. The number of times or counts corresponds to the width of a black bar, i.e., the distance between the leading and trailing edge of the bar at a certain velocity with which the reading or scanning is performed. Counter 10 counts in a corresponding manner *n* times for each pulse appearing at point D. According to the present embodiment counter 17 can be said to be comprised of two counters one of which, sub counter 17$G_1$, the function of which is evident from $G_1$ in FIG. 2, counts during the time which corresponds to the distance between the leading edge of a bar and the trailing edge of the following bar, i.e., the distances *a*, *b*, and *c* in FIG. 2. The other sub counter 17$G_2$ of counter 17, the function of which is evident from $G_2$ in FIG. 2, counts during the time corresponding to the distance between a leading edge of a bar and a trailing edge of the following bar, whereby the first of these bars is the second bar the width of which is counted by sub counter 17$G_1$, and the second of these bars is the first bar in the following group of two bars the width of which is counted by counter 17$G_1$. The distances which sub counter 17$G_2$ measures thus consist of distances *d*, *e* and *f* in FIG. 2.

During normal conditions, i.e., when any malformed bar or a spot is not on the data carrier, 100 pulses, for instance, are counted by counter 9 for every second bar and 100 pulses are counted by counter 10 for every other second bar at a certain reading velocity. This is evident from E and F in FIG. 2 when reader 2 is moved over the data record 20 from left to right, for example. Each sub counter 17$G_1$ and 17$G_2$, counts at a certain velocity for the reader, 100 pulses for each bar it is inteded to count and $2 \times 100 = 200$ pulses for each short distance between the bars it is intended to count. This short distance approximately corresponds to the width of a bar. If a distance between two bars is three times as long as said short distance, which is shown between the second and third bar from the left in FIG. 2, $3 \times 2 \times 100 = 600$ pulses are counted. Thus, it should be noted that when black bars on data record 20 are discovered by reader 2, counter 17 counts a number of pulses which corresponds to the width of the bars. If white distances between bars are discovered, counter 17 counts pulses the number of which corresponds to $2 \times$ the length of the distances. This is also evident from FIG. 1 where input 13*a* of AND gate 13 receives signals corresponding to black bars and the other input 13*b* is supplied with the frequency *f* while input 15*a* of AND gate 15 receives signals corresponding to the distances between bars (white fields) and the other input 15*b* is supplied with the frequency 2*f*. The reason why the white fields are counted with the double frequency is that it is then possible to calculate the distances between the center lines of the bars. This is described in detail in the filed Swedish Pat. No. 327,107.

Of course, it is of no account how many pulses counters 9, 10 and 17 count for each distance. The main thing is that the velocity of reader 2 is not allowed to be changed essentially during the reading. This means that equally wide bars and distances between bars on the data record must generate approximately the same number of pulses. It has appeared that the variation in velocity which is usual when the handheld, penshaped reader 2 is moved over the data record — the total length of which is approximately 3 cm — is so small that it does not influence the correctness of the measuring result at all.

A comparison of the contents in counters 9, 10 and 17 which, for instance, is made at the point of time $g$ by comparators 11 and 12 after the division circuit 18 has halved the number of pulses emitted from counter 17, gives the result that counter 9, counter 10 and sub counter 17$G_1$ of counter 17 each contains the number 100 while the sub counter 17$G_2$ of counter 17 contains the number 800. The contents of the sub counter 17$G_1$, however, is not interesting at this point of time because it has not measured any complete distance at the point of time $g$ but has only measured a part of distance $b$. The value of sub counter 17$G_1$ will thus not be emitted and sent to the division circuit 18 until the next comparison. In accordance herewith only the contents of sub counter 17$G_2$ is selected for comparison with the contents of counters 9 and 10. This selection is accomplished by means of any suitable bistable element in counter 17.

If the condition is made that the contents of counter 17 divided by 2, in this case the contents of sub counter 17$G_2$ divided by 2, shall be at least equal to the contents of counter 9 and at least equal to the contents of counter 10 in order that the information read shall be regarded as acceptable, it is understood that the information within distance $d$ is correct, i.e., $(100 \times 2 \times 300 + 100)/2 = 400 > 100$.

If the comparison which is made at a point of time $h$ in FIG. 2 is now observed it is noted that counters 9 and 10 each contains 100 pulses while the information from the division circuit 18 is $(100 \times 2 \times 100 + 100)/2 = 200$ pulses (sub counter 17$G_1$ is working). Because $200 > 100$ it is noted that also the information within distance $b$ is correct.

If the comparison is now made at a point of time $i$, just before an asymmetric, dark spot 19 appears together with the left bar within distance $c$, this distance comprising distances $n$, $o$ and $p$, counter 9 contains approximately 350 pulses (the width of one bar + the width of the dark spot, which is approximately 2.5 times as wide as said bar, i.e., the distance $n$) and counter 10 contains 100 pulses. Sub counter 17$G_1$, which is the one which is selected at this point of time, contains $100 + 250 + 2 \times 50 + 100 = 550$ pulses which after division by $2 = 275$. This content is now compared by means of the comparators 11 and 12 with the contents of counters 9 and 10 which gives the result that $275 < 350$. This implies that an error signal is generated by comparator 11, this signal being transmitted to the data processing unit to which the device according to FIG. 1 is connected. The signal indicates to the data processing unit that the information recorded on data carrier 20 is not to be accepted by the data processing unit. How this is accomplished will not be described further since it is evident for a person skilled in the art that this can be performed in many different manners. When the operator of reader 2 receives a signal indication that an incorrect reading has been made he will make a new attempt to read data carrer 20. Herewith, the probability is great that optical reader 2 at the second reading or scanning attempt will not be moved in the same path as before, this last mentioned path being the cause for the previous incorrect reading. If the spot, or smudge, 19 does not extend in the whole direction of the length of the bar, the probability is great that a correct reading will be made during the new reading attempt.

As is evident from FIG. 2, the smudge 19 is detected at a point of time before the point of time $i$, namely at the point of time $k$ when the distance $e$ is measured, this distance including the distances $l$, $m$ and a part of the distance $n$. When measuring the distance $e$ counter 9 which measures the bar before the spot 19 will count 350 pulses, since the bar is ahead of spot 19 and this spot will be read. Counter 10 then contains 100 while sub counter 17$G_2$, which is the counter which has been selected for reading, counts $100 + 100 \times 2 + 350 = 650$. At the following division by 2 and upon comparison with the contents of counters 9 and 10 and error signal is generated because $650/2 = 325 > 350$.

It should be noted that the comparison of the contents of counters 9, 10 and 17 is made each time and just after a bar has been read. The points of time for the comparison are determined by suitable time circuits (not shown).

The reason why two sub counters 17$G_1$ and 17$G_2$ are used is that a greater security for the error indication is obtained since each bar is compared with the distance before it and the distance after it. Thus, it should be noted that only one counter instead of sub counters 17$G_1$ and 17$G_2$ can be used without departing from the concept of the present invention. Of course, counter 17 can be designed to measure all existing distances, for instance by moving the contents of counters 9 and 10 to counter 17. Only one counter 17 is then necessary. It should also be mentioned that counter 17 can suitably be used for measuring the different distances between the bars on the data record 20 in order to detect the recorded code. How this is done forms no part of the present invention and a description thereof is therefore not needed.

It should be evident from the above description that the width of spot 19 is calculated and compared with the widths of adjacent bars (distances $l$ and $p$), the distance ($m$ and $o$) between spot 19 with the preceding bar and adjacent bar, whereby the dimension of spot 19 must be within certain determined limits in relation to these distances in order that the distance $o$, for instance shall not be regarded as a short, acceptable distance. The change 19 of the code representation does not need to have a homogeneous reflectivity characteristic and variations within wide limits are permitted.

Even though the present invention has been described with reference to a particular embodiment, it is, of course, not the intention that the invention shall be limited thereby, but only limited to that which is stated in the claims. For instance, the code representation can be designed in different ways using different bar widths, different reflectivities, text en clair, etc. It is also possible to use alternative reflection and time detecting devices and methods.

I claim:

1. A method for checking for information errors during reading of data carriers containing a series of markings representing a coded record, the code comprising markings have predetermined widths, and the errors being generated by markings having an error-causing spot associated therewith comprising the steps of:

detecting the leading and trailing edge of each marking in a series of at least three markings and computing the width of each of said at least three markings;

computing the distance, *m*, between the trailing edge of the first detected marking and the leading edge of the second detected marking;

computing the distance, *o*, between the trailing edge of said second-detected marking and the leading edge of the third-detected marking;

comparing the computed width, *n*, of said second-detected marking with said distance *m* and emitting an error signal if said width *n* exceeds said distance *m* by a predetermined ratio; and comparing said width *n* with said distance *o* and emitting an error signal if width *n* exceeds distance *o* by a predetermined ratio.

2. Method in accordance with claim 1 further comprising the steps of:

comparing said width *n* with the computed width, *l*, of said first-detected marking and emitting an error signal if width *n* exceeds width *l* by a predetermined ratio; and comparing said width *n* with the computed width, *p*, of said third-detected marking and emitting an error signal if width *n* exceeds width *p* by a predetermined ratio.

3. Method in accordance with claim 2 wherein:

first counter means computes the width of each of said markings; and second counter means determines the distance between the leading edge of said first-detected marking and the trailiing edge of said second-detected marking and the distance between the leading edge of said second-detected marking and the trailing edge of said third-detected marking.

4. Method in accordance with claim 3 wherein:

said first counter means comprises a first counter for computing said width *n* and a second counter for computing said widths *l* and *p*.

5. Method in accordance with claim 4 wherein:

said second counter means comprises a third counter for determining the distance between the leading edge of said first-detected marking and the trailing edge of said second-detected marking and a fourth counter for determining the distance between the leading edge of said second-detected marking and the trailing edge of said third-detected marking.

6. Method in accordance with claim 5 wherein:

said first counter means and said third counter are supplied with a counting pulse having a first frequency; and said fourth counter is supplied with a counting pulse having a second frequency.

7. Method in accordance with claim 6 wherein:

said second frequency is twice said first frequency.

8. Method in accordance with claim 7 wherein:

a reflection detector emits signals representing the markings and the distances between said markings to said first counter means and said second counter means via gate means.

9. Method in accordance with claim 8 wherein:

said gate means comprises a first gate coupled to said first counter, a second gate coupled to said second counter, a third gate coupled to said third counter and a fourth gate coupled to said fourth counter;

said first frequency pulse being applied to said first, second and third gates and said fourth gate.

10. A device for checking for information errors during reading of data carriers containing a series of markings representing a coded record, the code comprising markings having predetermined widths, and the errors being generated by markings having an error-causing spot associated therewith comprising:

reflection detector means for detecting the leading and trailing edge of each marking in a series of at least three markings and computing the width of each of said at least three markings;

computing means for computing the distance *m* between the trailing edge of the first detected marking and the leading edge of the second detected marking;

said computing means computing the distance *o* between the trailing edge of said second-detected marking and the leading edge of the third-detected marking;

comparing means for comparing the computed width *n* of said second-detected marking with said distance *m;* and emitting means for emitting an error signal if said width *n* exceeds said distance *m* by a predetermined ratio;

said comparing means comparing said width *n* with said distance *o;* and said emitting means emitting an error signal if width *n* exceeds distance *o* by a predetermined ratio.

11. Device in accordance with claim 10, wherein:

said comparing means compares said width *n* with the computed width, *l*, of said first-detected marking; said emitting means emitting an error signal if width *n* exceeds width *l* by a predetermined ratio; and said comparing means compares said width *n* with the computed width, *p* of said third-detected marking;

said emitting means emitting an error signal if width *n* exceeds width *p* by a predetermined ratio.

12. Device in accordance with claim 11 wherein:

said reflection detector means includes first counter means for computing the width of each of said markings and said computing means includes second counter means for determining the distance between the leading edge of said first-detected marking and the trailing edge of said second-detected marking and the distance between the leading edge of said second-detected marking and the trailing edge of said third-detected marking.

13. Device in accordance with claim 12 wherein:

said first counter means comprises a first counter for computing said width *n* and a second counter for computing said widths *l* and *p*.

14. Device in accordance with claim 13 wherein:

said second counter means comprises a third counter for determining the distance between the leading edge of said first-detected marking and the trailling edge of said second-detected marking and a fourth counter for determining the distance between the leading edge of said second-detected marking and the trailing edge of said third-detected marking.

15. Device in accordance with claim 14 wherein:
said first counter means and said third counter are supplied with a counting pulse having a first frequency; and
said fourth counter is supplied with a counting pulse having a second frequency which is twice said first frequency.

16. Device in accordance with claim 15 wherein:
said reflection detector emits signals representing the markings and the distances between said markings to said first counter means and said second counter means via gate means.

17. Device in accordance with claim 16 wherein:
said gate means comprises a first gate coupled to said first counter, a second gate coupled to said second counter, a third gate coupled to said third counter and a fourth gate coupled to said fourth counter;
said first frequency pulse being applied to said first, second and third gates and said second frequency pulse being applied to said fourth gate.

* * * * *

UNITED STATES PATENT OFFICE
CERTIFICATE OF CORRECTION

Patent No. 3,893,077 Dated July 1, 1975

Inventor(s) Rune L. Myren

It is certified that error appears in the above-identified patent and that said Letters Patent are hereby corrected as shown below:

Column 6, line 28, the " > " should read -- < --.

Signed and Sealed this

First Day of February 1977

[SEAL]

*Attest:*

RUTH C. MASON
*Attesting Officer*

C. MARSHALL DANN
*Commissioner of Patents and Trademarks*